April 8, 1924.

W. J. CATES

GRAVITY FEED GOVERNOR

Filed June 8, 1923

Inventor
W. J. Cates
by his Attorneys

April 8, 1924.
W. J. CATES
1,489,344
GRAVITY FEED GOVERNOR
Filed June 8, 1923  3 Sheets-Sheet 2
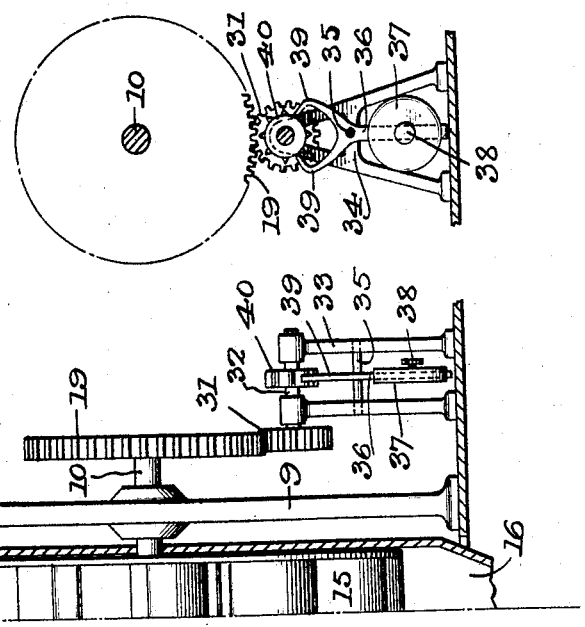
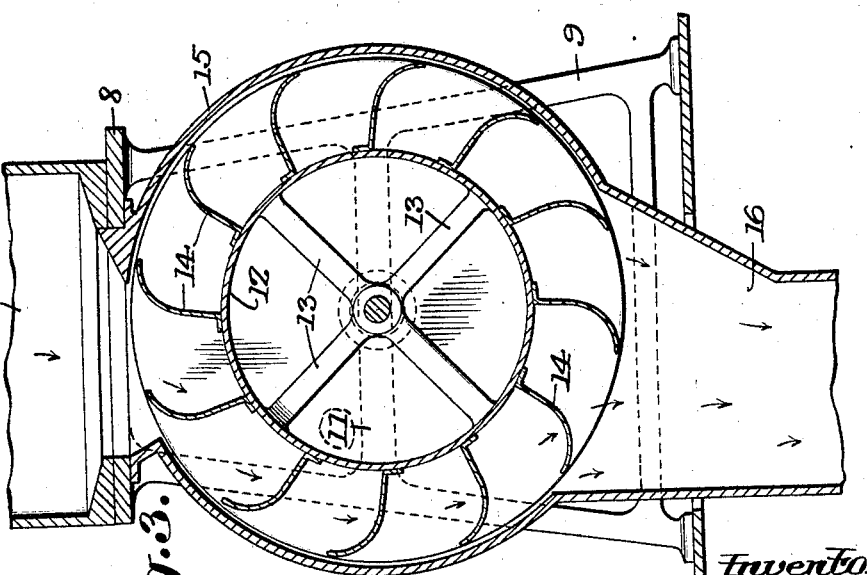

April 8, 1924.
W. J. CATES
1,489,344
GRAVITY FEED GOVERNOR
Filed June 8, 1923
3 Sheets-Sheet 3
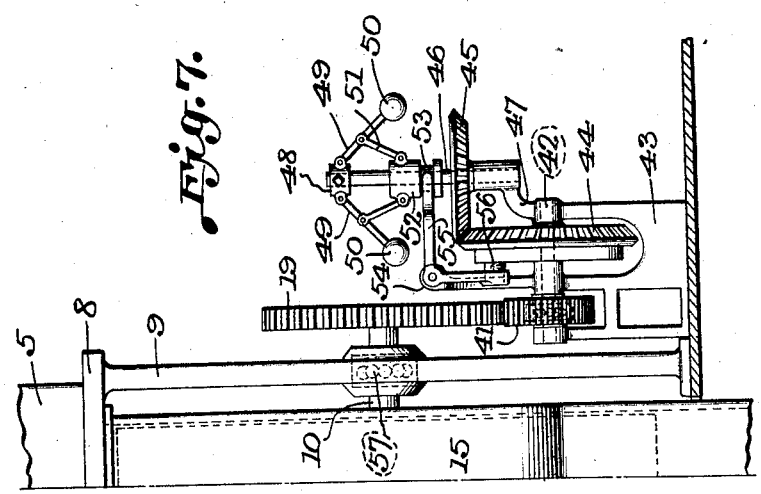
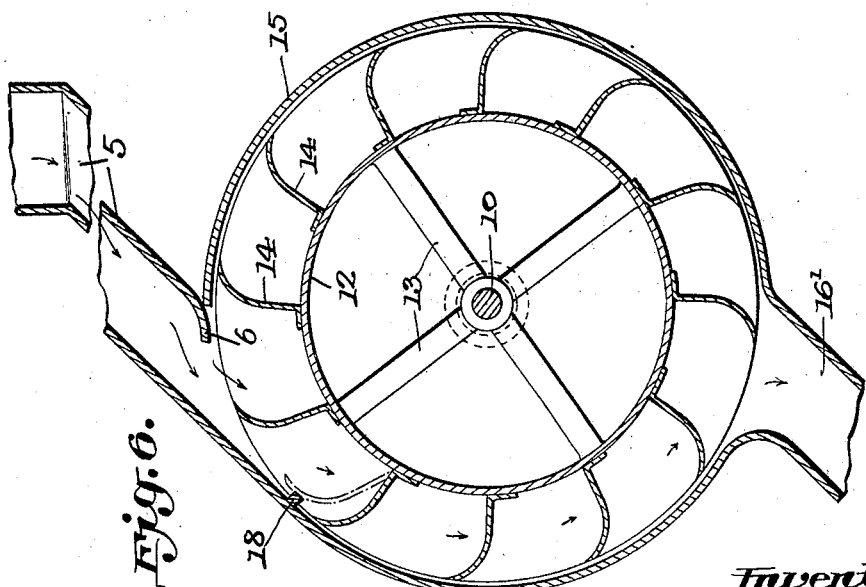
Inventor
W. J. Cates
by his Attorneys Patented Apr. 8, 1924.

1,489,344

UNITED STATES PATENT OFFICE.

WILLIAM JOE CATES, OF SALINA, KANSAS.

GRAVITY-FEED GOVERNOR.

Application filed June 8, 1923. Serial No. 644,288.

*To all whom it may concern:*

Be it known that I, WILLIAM J. CATES, a citizen of the United States, and resident of Salina, in the county of Saline and State of Kansas, have invented certain new and useful Improvements in Gravity-Feed Governors, of which the following is a specification.

Wheat flour is graded according to its protein contents, and wheat containing different amounts of protein is stored in different bins. To produce any desired flour of given protein content, it is necessary to mix several grades of wheat. These grades are stored in elevators according to the weight per bushel, and to obtain the desired mixture, it may be necessary to mix two or more grades in differing amounts. For example, if 2 parts of 58 pound wheat, one part of 60 pound wheat and 1 part of 64 pound wheat are mixed, the resulting mixture will have a weight of 60 pounds to the bushel.

Heretofore, this mixture has usually been obtained by various measuring devices and it has always been necessary to use definite amounts. This has been slow and laborious and more or less unsatisfactory.

An object of my invention is to provide means for properly mixing different grades of cereal in any desired relative proportions which will operate uniformly and with ease, and wherein the flow can be cut off at any time without affecting the correctness of the mixture.

Another object is to employ a gravity flow of the cereal which will operate the regulating device and set in motion a governor which will permit the gravity feed to operate only at a predetermined rate.

Further objects will be apparent from the following detailed description and appended claims.

In the drawings:

Figure 3 is a vertical section through a rotary delivery device of somewhat different form.

Figure 4 is a side view of a fragment of the delivery device and a different form of governor from that shown in Figure 2.

Figure 5 is a view of the governor taken from the side of Figure 4.

Figure 6 is a vertical section through still another form of delivery device.

Figure 7 is a side view of this delivery device and a third form of governor.

Figure 1:
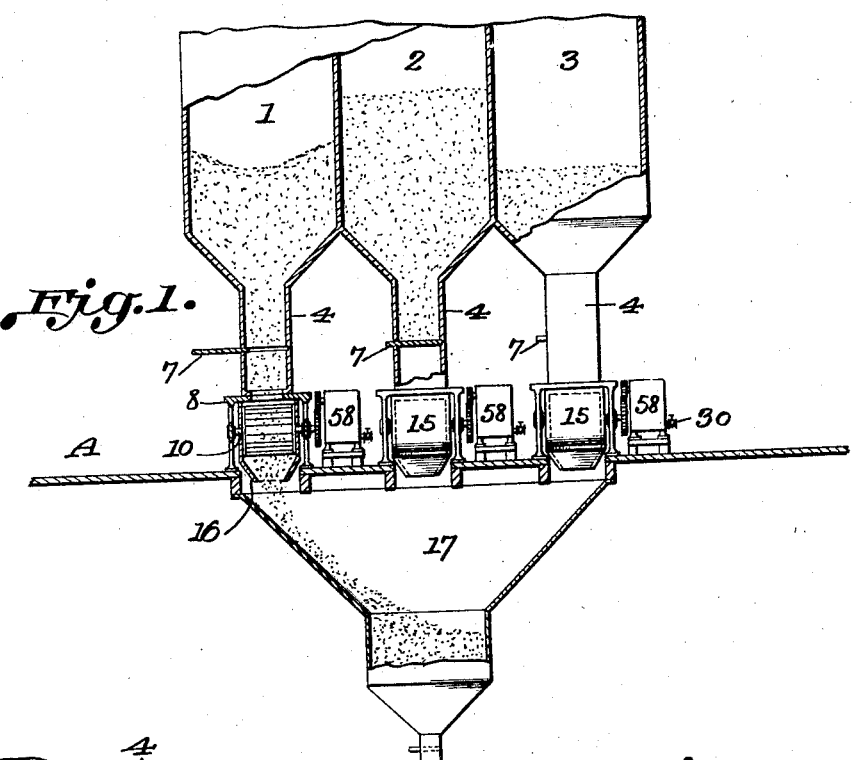
Figure 1 is a view partly in vertical section and somewhat diagrammatic in character, of a plurality of storage bins each provided with a controlling device and emptying into a common receptacle.

There are illustrated three bins 1, 2 and 3, although any desired number may be employed, and these are provided with spouts 4 and cut-off slides 7 at any desired point. Each spout opens into a rotary device supported on a frame 8 which comprises legs 9 and cross bars 11. In these cross bars is supported a shaft 10 and fixed to the shaft are a plurality of arms 13 which carry a cylindrical drum 12. Fixed to the outside of this drum are curved blades 14 the ends of which just clear the inner wall of a larger cylindrical drum 15 supported by the frame 8. The space between each pair of blades 14 and the two drums constitutes a bucket or compartment which is adapted to be filled with grain passing through the spout or chute 4.

The frames 8 rest on the floor A or a suitable platform, and each cylinder 15 has its lower side formed into an extension 16 through which the wheat or other grain delivered from the rotary device passes into the bin 17. The form of the supply spouts may be somewhat varied, and in Figure 6 is shown one which is inclined as shown at 5 and has a lip 6 at one side which directs the grain against the blades 14 more directly than in the other figures. The discharge chute 16' is also inclined. In the upper part of the outer drum 15 is placed a strip 18 of fibre or some similar material which contacts with the ends of the blades as they pass, preventing the passage of grain from one bucket to the other. The blades may be made slightly resilient to bend when passing this strip 18.

It is obvious that the grain is fed by gravity entirely, the buckets on one side going down full while those on the other side come up empty. Since the compartments or buckets are equal in size and are filled directly from the chute or spout, it necessarily follows that the amount of grain that will pass through the rotary device in any given time will depend upon the speed with which it rotates.

I have therefore taken advantage of this fact and provide controlling devices for regulating the speed of rotation of the drum and consequently the amount of grain that will be delivered thereby in a given length of time. The particular type of regulating device is unimportant, except that it should be adjustable and of some type that will prevent the speed from passing a predetermined maximum.

Figure 2:
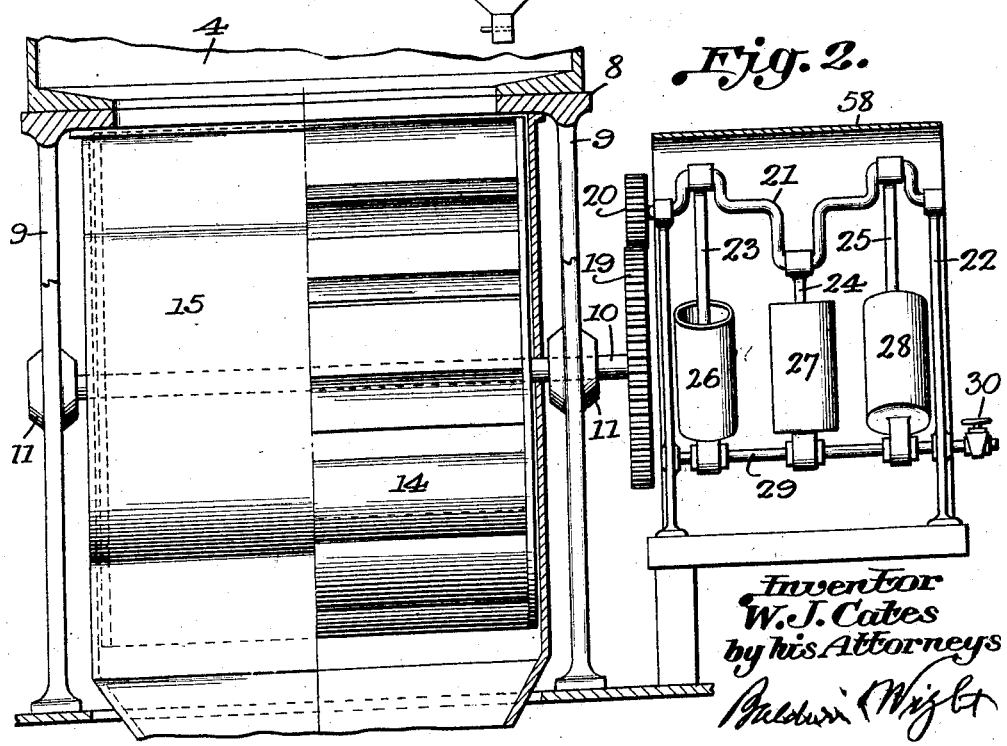
Figure 2 is a side view, partly in section, on a much larger scale, of one of the rotary delivery devices and its governor.

In the form illustrated in Figures 1 and 2, there is shown an air pump governor. To the shaft 10 is fastened a large gear 19 which meshes with a smaller gear 20 on a shaft 21 mounted to rotate in a frame 22. This shaft is a crank shaft and has connected to it three piston rods 23, 24 and 25 which are provided with pistons working in cylinders 26, 27 and 28. These cylinders connect at their closed ends with a pipe 29 which is provided with a valve 30. The rods are connected to different portions of the shaft 21 so that no two reach dead center position at the same time. As the piston is pushed downward into the cylinder, it forces the air into the pipe 29 and the ease with which it escapes will depend upon the size of the valve opening 30. By adjusting this valve the speed of the shaft 21 and consequently of the shaft 10 can be regulated accurately and with slight variations.

In the form shown in Figures 4 and 5, the gear 19 meshes with a smaller gear 31 on a shaft 32 mounted in a frame 33. The cross or connecting bars 34 of the frame have a shaft 35 mounted therein upon which is pivoted a pendulum 36 with a weight 37 that may be held in adjusted position by a set screw 38. The upper end of the pendulum is formed with two dogs 39 which alternately cooperate with a ratchet wheel 40 on the shaft 32. This constitutes an escapement governor and the shaft 32 and consequently the speed of the shaft 10 can be regulated by varying the position of the pendulum bob 37 and consequent speed of the escapement.

In the form shown in Figure 7, the gear 19 meshes with a gear 41 on a shaft 42 mounted in bearings in a support 43. On this shaft is a bevel gear 44 which meshes with a bevel gear 45 on a shaft 46 carried by a bracket 47 of the support 43. To the free end of this shaft is fastened a collar 48 from which extend arms 49 carrying weights 50 at their outer ends, and these arms are connected by links 51 with a sliding collar 52 on the shaft 46 and having an annular groove 53. Carried by a bracket arm 54 is a bell crank lever 55 one arm of which is forked to engage the groove 53 while the other arm carries a brake element 56 adapted to engage the cooperating brake element on the back of the bevel gear 44. As the speed increases the arms 49 and weights 50 swing outward through centrifugal motion raising the collar 52 and through the bell crank causing the brake element 56 to press with greater force against the back of the bevel gear. This will tend to give a uniform rotation of the shaft 42 and consequently of the shaft 10. Adjustment of the collar 48 will vary the point at which the brake exerts its greatest force.

In all cases the shaft 10 is or may be mounted on ball bearings 57 as shown in Figure 7. The other working parts may be mounted as desired and the governor may be inclosed in a casing 58. By the use of these regulating devices the speed of rotation of the shafts 10 may be set as desired, and when all the slides 7 are withdrawn at the same time, the grain will pass from each bin in the proper proportion. It is unnecessary to allow the devices to run for any definite length of time or in any way to measure or weigh the amount of grain passing therethrough. So long as the devices run for the same length of time, the grain from the various bins will be mixed in the proper proportions.

Either regulating device can be used with either form of rotary device, and other regulating devices may be employed. The feed of other materials may be controlled. Various detail changes may be made, and in general it is to be understood that the invention is limited only by the scope of the appended claims.

By the apparatus hereinbefore described materials of different kinds may be blended to the desired extent. In general the apparatus comprises a plurality of supply hoppers, a bin to which the blended material is delivered, a pocketed rotary feeder interposed between each supply hopper and the bin, and a plurality of means one for each feeder operated wholly independently of any other such means for automatically regulating the delivery of material by said rotary feeder to the bin. It will be further observed that the rotary feeder is operated solely by gravity. The regulating means for each feeder is operated by said feeder and is not in any way influenced by the action of any other feeder in the series. In this way a steady continuous rotary movement may be given to the feeder in contradistinction to an intermittent or step-by-step movement but the speed or rate of rotation of the feeder, although continuous, may be regulated and then maintained constant during the operation.

I claim as my invention:

1. Apparatus for blending materials of different kinds, comprising a plurality of supply hoppers, a bin to which the blended material is delivered, a pocketed rotary feeder interposed between each hopper and said bin which is rotated by the weight of material delivered by the associated hopper, and a separate regulating device for each feeder actuated by the feeder with which it is associated which controls the speed of rotation of said associated feeder, and means for setting the several regulating devices to cause the feeders to rotate at different speeds for the purpose specified.

2. Apparatus for blending materials of different kinds, consisting of a plurality of supply hoppers, a receiver for the blended material, a rotary pocketed feeder interposed between each hopper and said receiver and which is operated solely by the weight of material entering the pockets, and a regulating device for each hopper for separately controlling the speed of rotation of each feeder which is operatively connected with its associated feeder only and is thus actuated thereby, the organization being such that the rotary feeders may be rotated by the weight of the material at different speed and maintained at such speeds while delivering the material to be blended.

In testimony whereof, I have hereunto subscribed my name.

WILLIAM JOE CATES.